(12) United States Patent
Waatti et al.

(10) Patent No.: US 6,331,261 B1
(45) Date of Patent: Dec. 18, 2001

(54) WATER SOFTENER SALT FORMULATION

(75) Inventors: Kurt J. Waatti; Eugene J. Kuhajek, both of Crystal Lake, IL (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/410,313

(22) Filed: Oct. 1, 1999

(51) Int. Cl.[7] ............................. C01B 31/16; B01J 20/04; B01J 20/22; B01J 20/34
(52) U.S. Cl. .............................. 252/184; 502/22; 502/24; 502/25
(58) Field of Search .................................. 252/184, 192; 502/22, 24, 25; 521/26

(56) References Cited

U.S. PATENT DOCUMENTS

| | | | |
|---|---|---|---|
| 2,769,787 | * | 11/1956 | Diamond . |
| 3,454,503 | * | 7/1969 | Blankenhorn et al. . |
| 4,071,446 | * | 1/1978 | Kunin ..................................... 210/32 |
| 4,083,782 | * | 4/1978 | Kunin ..................................... 210/32 |
| 4,116,860 | * | 9/1978 | Kunin ..................................... 252/192 |
| 4,275,234 | * | 6/1981 | Baniel et al. ......................... 562/584 |
| 4,540,715 | * | 9/1985 | Waatti et al. ........................... 521/26 |
| 4,873,108 | * | 10/1989 | De Rooij et al. ..................... 426/533 |
| 5,653,917 | * | 8/1997 | Singerman ....................... 252/389.62 |

\* cited by examiner

Primary Examiner—Joseph D. Anthony

(57) ABSTRACT

The monosodium and monopotassium citrates are improved iron-sequestering agents in salt compositions for regenerating spent water softener cation exchange resins. The dry compositions comprise a surfactant, an alkali metal chloride selected from the group consisting of sodium chloride and potassium chloride, and an iron sequestering agent selected from the group consisting of monosodium citrate and monopotassium citrate. The composition is preferably provided in the form of compacted pellets or blocks. The method for regenerating the spent cation exchange resin bed comprises the step of contacting the resin bed with an aqueous brine solution containing the citrate and a surfactant and having a pH of about 3.5 to 4.5.

7 Claims, No Drawings

WATER SOFTENER SALT FORMULATION

FIELD OF THE INVENTION

The present invention relates to an improved salt composition for regenerating cation exchange resin beds in water softeners and inhibiting fouling of the resin by the iron commonly found in water supplies.

BACKGROUND OF THE INVENTION

Water softening systems are used in households and by industry to replace hardness cations such as calcium and magnesium with sodium ions by passing an incoming water supply through a bed of cationic exchange resin beads or particles. When the ion exchange resin bed periodically becomes saturated with ions removed from the incoming water and depleted of sodium ions, it is recharged by passing a brine solution consisting essentially of sodium chloride through the resin bed. This replenishes the bed with sodium ions and removes the calcium, magnesium, or other ions previously removed from the incoming water.

The iron problem is well known in the softening art, and attempts have been made to remove iron in all its forms from water softening resin beds. The exchange capacity of an ion exchange resin bed deteriorates as the iron in the incoming water collects in the resin bed and is not removed by the recharging process. Sooner or later, depending on the level of maintenance of the resin bed and the characteristics of the water supply being softened, the resin becomes "fouled", meaning that the resin bed's capacity to soften water has diminished so much that the resin must be specially treated to restore its softening capacity or be replaced.

Iron can exist in the water supply as clear water iron, red water iron, bacterial iron, colloidal iron, or tannate iron. Clear water iron is iron in the divalent (ferrous), soluble state. Clear water iron is not visible when the water is drawn, but when the water is allowed to stand for a prolonged period the ferrous ions are oxidized by air to become ferric or trivalent ions, which settle as a precipitate of ferric hydroxide. The iron may also oxidize after having been exchanged into a resin bed, which may prevent it from being removed by regeneration. Red water iron is already oxidized to the ferric state when it reaches the water softener. Water containing red water iron is cloudy and orange when drawn. This form of iron may be filtered by the resin bed or may be passed and be present in the softened water. Bacterial iron is a third troublesome form of iron, and is caused by iron crenothrix bacteria which feed on the iron in the water supply. These bacteria thrive in water softener resin beds supplied with ample iron, and the resulting biomass clouds the water system, creates a bad taste and odor in the softened water, and occasionally releases large, unsightly masses of rust colored material. Colloidal iron is similar to red water iron, but is composed of particles too small to settle. Colloidal iron will normally pass directly through a water softener. Finally, tannate iron, which is quite similar in appearance to colloidal iron, is ferric iron complexed and held in solution by tannates or other naturally occurring soil ingredients. This final form of iron usually passes through a water softening resin bed. Iron present in any of the previously discussed forms can foul the resin bed. Oxidation of ferrous iron captured by the resin beads can crack them, thereby physically degrading the resin bed as well.

Chelating compounds for sequestering iron, including citric acid, are taught in U.S. Pat. No. 3,454,503. A method for regenerating cation exchange resins fouled by iron by adding to the brine regeneration medium any of a variety of organic acids, particularly citric acid, is taught in U.S. Pat. No. 2,769,787. Citric acid is used commercially in water softening salt compositions to remove iron from the system. Compositions for regenerating resin beds, comprising a major proportion of an alkali metal chloride, an alkali metal carbonate, and an alkali metal carboxylate chelating agent such as sodium and potassium citrate are disclosed in U.S. Pat. Nos. 4,071,446; 4,083,782; and 4,116,860. These compositions have extremely high concentrations of sodium citrate (5 to 15 per cent) and pH values of 7–9.5 and are not designed for regenerating conventional sulfonate-based resins.

U.S. Pat. No. 4,540,715 teaches that regular use of a synergistic combination of sodium citrate, as a sequestering agent, and a surfactant identified as an alkylated diphenyl oxide disulfonate can protect cation exchange beds against deterioration caused by the accumulation of iron, other insolubles, oily and fatty deposits, and other impurities found in various water supplies. Sodium citrate, the common name for trisodium citrate dihydrate, imparts a pH of about 8 to a brine containing it. Citrate ion, the active part of the sequestering agent, constitutes only about 64% of its weight because of the high sodium and water content.

SUMMARY OF THE INVENTION

It is an object of this invention, therefore, to provide a sequestering agent that is more effective in iron removal from an ion exchange resin than sodium citrate.

It is a related object of this invention to provide a novel sequestering agent that operates at a pH as low as about 3.5.

It is another related object of this invention to provide a method for regenerating an iron-contaminated cation exchange resin and removing about 90% or more of the iron.

It is yet another related object of this invention to provide a composition for use in said method.

These and other objects of this invention which will become apparent from the following disclosure are achieved by a composition comprising an alkali metal chloride having a molecular weight of from about 58 to about 75 and from about 400 to about 6000 parts, advantageously from about 1000 to about 1800 parts, of monosodium citrate and/or monopotassium citrate per million parts by weight of the composition (hereinafter ppm). The alkali metal chloride is referred to hereinafter as the water softener regeneration salt or, simply, regeneration salt. The monosodium citrate and/or monopotassium citrate, hereinafter referred to as the iron-sequestering agent, is suitably added to the regeneration salt as a concentrated aqueous solution.

For the purposes of this disclosure, SC means trisodium citrate dihydrate, MSC means monosodium citrate, and MPC means monopotassium citrate. In the water softening art, a resin is exhausted when the effluent hardness of the water is equal to the influent hardness. In practice, however, regeneration must be initiated prior to total exhaustion of the resin.

DESCRIPTION OF A PREFERRED EMBODIMENT OF THE INVENTION

A granular alkali metal chloride used conventionally as a compactor feedstock and other components of the composition are mixed together homogeneously and passed through conventional compacting equipment to make pellets or blocks for use as water softening products in this invention.

In one embodiment of the invention, the aqueous solution of the sequestering agent is made by mixing highly concentrated solutions of equimolar amounts of citric acid and sodium or potassium hydroxide, or a mixture of said hydroxides. As a practical matter, the base is added to the citric acid until the pH of the solution is about 3. The concentration may be as high as the solubility of each component allows and it is highly desirable to add as little water to the regeneration salt as possible. Because of the difficulties associated with dissolving large quantities of solids in relatively small volumes of water, the concentrations of the acid and the base may be as much as about 50 % by weight. Thus, from about 900 to about 13000 ppm of the concentrated MSC or MPC solution is added to the regeneration salt. The amount of said solution may be, for example, from about 2200 to about 3900 ppm of the regeneration salt, by weight.

The concentrated solution of the iron-sequestering agent may be mixed with the regeneration salt at any convenient stage before the salt is fed into the compacting apparatus, sprayed on the compacted salt, or added to the salt as it is being conveyed to the compacting apparatus by a screw conveyor. The pH of brine made from the thus treated regeneration salt may be, for example, about 3.8 or from about 3.5 to about 4.5.

The iron oxides and other particulate matter are often bound to the resin beads by hydrophobic oily matter which defies removal when the resin bed is backwashed or otherwise treated with aqueous solutions. Surfactants have been recommended in the water softening literature for restoring resin beds which are so fouled that regeneration would be pointless without pretreatment. Thus, the composition of this invention may include an amount of surfactant suited for its routine use for the removal of iron while regenerating cation exchange resin beds. Suitably, therefore, the composition of this invention contains from about 10 to about 400 ppm of a surfactant, advantageously from about 20 to about 300 ppm. Surfactants suitable for this invention are anionic, safe for human consumption at low levels in drinking water, low foaming at the normal level of use, soluble in saturated brine, compatible with hard water, and stable at the high temperatures encountered when compacting granulated salt to form products such as pellets. Suitable surfactants for this invention have the following formula:

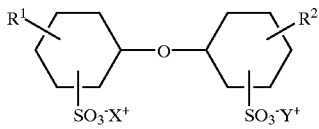

wherein X is a hydrogen ion or an ion of an alkali metal having an atomic weight of from about 23 to about 40, Y is an ion of an alkali metal having an atomic weight of from about 23 to about 40, $R^1$ is an aliphatic moiety having from 6 to 16 carbon atoms, e.g., an n-decyl moiety, and $R^2$ is selected from hydrogen and $R^1$. Said surfactants are commercially available under the trademark DOWFAX from the Dow Chemical Company, Midland, Mich. DOWFAX 3B2, for example, is a mixture of the sodium salt of an alkylated diphenyl oxide disulfonic acid wherein $R^1$ in the above formula is n-decyl and $R^2$ is hydrogen and the sodium salt of another wherein both $R^1$ and $R^2$ are n-decyl, and is available as a 45 % by weight solution in water.

The method for regenerating the spent cation exchange resin bed of a water softener comprises the step of contacting the resin bed with an aqueous solution containing from about 50,000 to about 150,000 ppm of a regeneration salt having a molecular weight of from about 58 to about 75, from about 400 to about 6000 ppm of the iron-sequestering agent, and, optionally, from about 20 to about 300 ppm of a surfactant. The pH of the brine that contacts the iron-contaminated exchange resin may be about 3.8 or from about 3.5 to about 4.5. The routine employment of this method will avoid the necessity of taking more extreme measures after the resin bed becomes fouled.

The invention does not exclude other ingredients which do not detract appreciably from the utility of the compositions disclosed herein. Thus, the following examples are provided solely for the purpose of illustrating rather than limiting the invention.

EXAMPLE 1

Twenty-five (25) gram samples of a fouled cation exchange resin having a certain iron content were weighed into each of 4 jars and 50 mls of a 10%$_{wt}$ sodium chloride solution in deionized water with or without additives, as shown in Table I, was added to the jars. The jars were capped and shaken for one hour and the solutions were filtered through #42 Whatman paper. The filtrates were diluted to a certain volume and analyzed for solubilized iron. The results in Table I show that, at equal weights, monosodium citrate removed 68% more iron than the sodium citrate and 69% of the amount removed by citric acid.

TABLE I

| Additive (0.35% of NaCl weight) | mg iron removed |
|---|---|
| None | 85 |
| Citric acid | 610 |
| MSC | 420 |
| SC | 250 |

The following laboratory procedure was employed to measure the effect of the improved salt composition on the exchange capacity of iron-contaminated resins as compared to sodium chloride plus sodium citrate and sodium chloride alone.

Water softener simulators, approximately $\frac{1}{45}$ the size of a full scale unit, were modeled after a residential water softener. These simulators consisted of upright 1000 ml cylinders 16⅞ inches (429 mm) tall, having an inside diameter of 2¾ inches (60 mm), plugged at the top by a rubber stopper penetrated by two tubes or pipes. A center tube extended to the bottom of the cylinder and was fitted with a fine-mesh screen to prevent resin from washing out. The lower end of a side tube was flush with the bottom of the stopper. Influent water could be directed down the center tube for backwashing the resin (upflow) or through the side tube to simulate the brine and rinse, siphon, and softening cycles of a softener.

Approximately 200 ml of glass beads were placed at the bottom of the cylinders before adding exactly 500 ml. of packed-down resin beads collected from residential water softeners. The volume of the beads was measured by placing a graduated cylinder containing resin beads and water on a vibrating table until settling was complete, then resin beads were added or removed to provide exactly 500 ml and the stopper was tightly secured to close the system.

The resin was backwashed with 2150 ml. of untreated water at a flow rate of 1080 ml/min to attain 50% expansion of the resin bed. The backwash water was filtered and the filter pads were saved for analysis. The water level was then siphoned down to an operating level of about 3 inches above the resin before starting the brining (regenerating) step.

The resin was regenerated with 481 g. of 10% sodium chloride solution (6 pounds of NaCl per cubic foot of resin) (2.7 kg per 28 liters) with no additives (Control) and with test additives. The brining flow rate was 22 ml./min. After brining, the resin was rinsed slowly with 660 ml. of deionized water at 33 ml./min. for 20 minutes, followed by a fast rinse consisting of 840 ml. of deionized water at 84 ml./min for 10 minutes. Effluents from the brine and rinse cycles were collected in a 2 liter volumetric flask for subsequent analysis.

Well water, obtained by a submersible pump situated 160 feet below the well head, was filtered through a 20 micron filter cartridge to remove particulates and precipitated iron. The remaining iron, in the form of clear water iron, amounted to 2 ppm. As little as 0.3 ppm iron is enough to cause iron-staining problems. The hardness, expressed as calcium carbonate, was 375 ppm or 21.9 grains per gal. On a weight basis, calcium represents about 62% of the hardness while magnesium represents 38%. Approximately fifty (50) liters of the well water was then passed through the resin at a flow rate of 300 ml./min. Thus, approximately 100 mg of iron was exchanged onto the resin in each run of the test procedure. In each run, the regeneration, rinsing, and softening steps were repeated. An automatic shut-off system is used to shut down the softening step when the resin needs to be regenerated. A sodium ion electrode inserted in the effluent water stream monitors the sodium ion concentration. The electrode senses a slow drop in the sodium ion concentration as it is replaced with hardness when breakthrough begins. In conjunction with an oxidation/reduction potential (ORP) controller and a solenoid valve, the hard water is shut off when the hardness reaches an arbitrary value in the vicinity of 115 ppm (~7 grains/gal). The simulator is then put into the backwash mode and water is passed up through the bed to remove entrapped air. The final volume (or softening capacity) of softened water was then recorded from a flow totalizer connected to a flow meter. In addition, the capacity is corrected by analyzing water hardness at shut-off and a factor applied in an EXCEL spreadsheet to calculate the volume of water treated at exactly 115.0 ppm hardness. The factor is derived from the slope of the exhaustion curves for the resins variously treated in each simulator.

The compositions of the regenerating salt solutions used as the Control and as examples of this invention, and as a Comparative Example (C. Ex.) are given in Table II. Test results are given in Tables III–V. Table III shows the amount of iron removed per regeneration cycle by the test formulations. Table V shows capacities and capacity losses. Table VI shows analyses of composite softened water samples taken during the 5–35 liter portion of a softening cycle.

TABLE II

| Example | Composition |
| --- | --- |
| Control | NaCl |
| C. Ex. | NaCl + 880 ppm SC + 75 ppm 3B2* |
| 3 | NaCl + 980 ppm MSC + 75 ppm 3B2 |
| 4 | NaCl + 1340 ppm MSC + 75 ppm 3B2 |

*mixture of sodium salts of alkylated diphenyloxide sulfonic acids

TABLE III

| Example | Runs | Av. mg Fe removed |
| --- | --- | --- |
| Control | 62 | 45.7 |
| C. Ex. | 47 | 80.8 |
| 3 | 47 | 95.5 |
| 4 | 54 | 93.8 |

TABLE IV

| Example | Runs | Original capacity (liters) | Final capacity | Loss (%) |
| --- | --- | --- | --- | --- |
| Control | 62 | 54.5 | 47.3 | 13.2 |
| C. Ex. | 54 | 53.9 | 50.9 | 5.4 |
| 3 | 54 | 51.9 | 49.8 | 4.0 |
| 4 | 54 | 53.4 | 51.5 | 3.7 |

TABLE V (Soft Water Quality)

| Example | Hardness* | ppm iron |
| --- | --- | --- |
| Control | 0.44 | 0.07 |
| C. Ex. | 0.39 | 0.04 |
| 3 | 0.40 | 0.03 |
| 4 | 0.43 | 0.05 |

*grains of $CaCO_3$ per gallon

What is claimed is:

1. An aqueous composition for regenerating an iron-contaminated cation exchange resin and removing about 90% or more of the iron, said composition consisting essentially of:
    (a) 400 ppm to 6000 ppm by weight of an iron sequestering agent selected from the group consisting of monosodium citrate and monopotassium citrate;
    (b) an alkali metal chloride having a molecular weight of from about 58 to about 75; and
    (c) a surfactant.
2. The aqueous composition of claim 1 wherein said surfactant is an alkali metal salt of an alkylated diphenyl oxide disulfonic acid.
3. The aqueous composition of claim 1 wherein said sequestering agent is present at from about 1000 ppm to about 1800 ppm.
4. The aqueous composition of claim 1 wherein said sequestering agent is monosodium citrate.
5. The aqueous composition of claim 1 wherein the amount of the surfactant is from about 10 ppm to about 400 ppm.
6. An aqueous composition for regenerating an iron-contaminated cation exchange resin and removing about 90% or more of the iron contaminating said resin, said composition consisting essentially of:
    (a) 400 ppm to 6000 ppm by weight of an iron sequestering agent selected from the group consisting of monosodium citrate and monopotassium citrate;
    (b) an alkali metal chloride having a molecular weight of from about 58 to about 75; and
    (c) 10 ppm to 400 ppm surfactant;
    wherein said composition has a pH of from about 3.8 to about 4.5.
7. The aqueous composition of claim 6 wherein the pH is from about 3.8 to about 4.0.

* * * * *